Oct. 6, 1942.  D. K. HUGHES  2,297,961

CASH REGISTER

Filed Aug. 25, 1938  7 Sheets-Sheet 2

Daniel K. Hughes
Inventor

By Carl Benst
His Attorney

Daniel K. Hughes
Inventor

By Carl Benst
His Attorney

Oct. 6, 1942.   D. K. HUGHES   2,297,961
CASH REGISTER
Filed Aug. 25, 1938   7 Sheets-Sheet 6

Daniel K. Hughes
Inventor
By Hearl Beust
His Attorney

Daniel K. Hughes
Inventor

By Carl Beust
His Attorney

Patented Oct. 6, 1942

2,297,961

UNITED STATES PATENT OFFICE 2,297,961

CASH REGISTER

Daniel K. Hughes, Dayton, Ohio, assignor to The National Cash Register Company, Dayton, Ohio, a corporation of Maryland Application August 25, 1938, Serial No. 226,690

5 Claims. (Cl. 101—96)

This invention relates to cash registers and like machines, and is more particularly concerned with printing mechanism employed therein to record transaction data and totals thereof.

One object of the present invention is to provide novel mechanism whereby the printing hammer will be actuated more forcibly during total printing operations which involve more type wheels than are normally used in printing data concerning transactions.

Another object of the invention is to provide simple and novel interlocking mechanism to prevent more than one of two totalizers from being reset to zero at one operation, and to prevent a totalizer from being reset to zero unless the total standing thereon has been printed.

Another object of the invention is to provide mechanism to enforce the completion of a total printing operation once it has been begun.

Another object of the invention is to provide mechanism to prevent the operator from disabling the printing hammer after a printing operation has been commenced.

The mechanism, an improvement to that disclosed in United States Letters Patent No. 1,870,-004, issued to Charles W. Green, and United States Letters Patent No. 1,742,701, issued to Frederick L. Fuller, is disclosed as applied to a cash register of the general type described in United States Letters Patent No. 2,031,860, issued to Bernis M. Shipley, to which patents reference is made.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

GENERAL DESCRIPTION

The novel mechanism embodying applicant's invention is shown in this disclosure as applied to what is known in the art as a key lever operated type of cash register.

The disclosed cash register is equipped with keys, a key coupler, differential members controlled by the keys, transmission elements, and segments for setting the type differentially, all of well known construction. These various elements, though broadly old in the art, will be briefly described for the purpose of showing one embodiment of the invention, although it is to be understood the mechanisms constituting the invention can be applied to other machines.

The indicator and receipt printing mechanisms, of the particular machine described herein, have not been illustrated because they are not necessary to an understanding of the invention although it is well known that in such machines it is the custom to use the same differentially settable members to set indicator and receipt printing mechanisms as well as the record strip printing mechanism.

Framework

The framework of the machine consists of a plurality of vertical frame plates, namely the left frame plate 301 (Figs. 1 and 2), the right frame plate 302 (Fig. 1) and the rear frame plate 303 (Figs. 1 and 2), joined together by a cross rod 29 (Figs. 1 and 2) and various journaled shafts to be later described.

Keyboard

Figure 1:
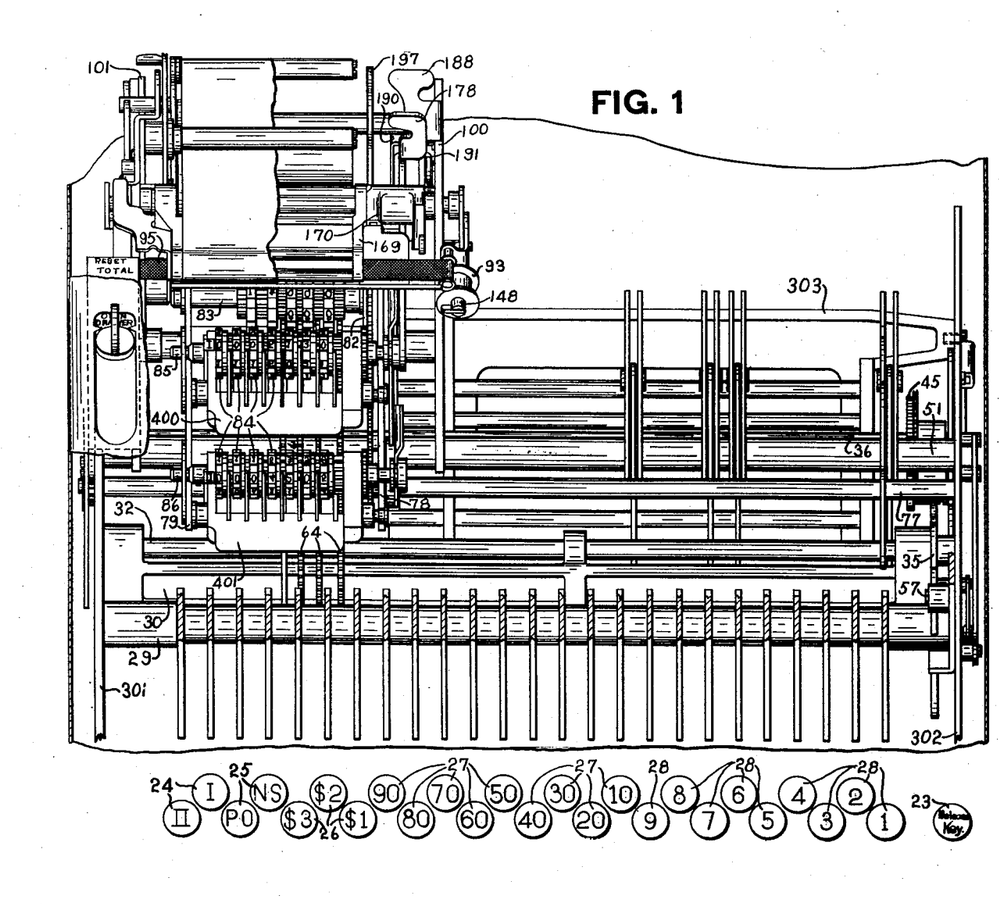
Fig. 1 is a front elevation of the machine with the cabinet removed and parts broken away, showing the key tips diagrammatically alined with their respective keys.

As shown in Fig. 1 the machine is equipped with banks of depressible operating keys denominated from left to right, the "clerk" keys 24, the "transaction" keys 25, the "dollar" keys 26, the "ten cent" keys 27; and the "cent" keys 28. The single "release" key 23 is provided for actuating the mechanism for restoring partially depressed keys.

This particular keyboard may be used to register amounts from one cent to three dollars and ninety nine cents but, as will be evident, any arrangement of keys may be used without affecting the application or operation of the printing mechanism which is the subject of this invention.

All of the keys, one of which is represented by a ten cent key 27 (Fig. 2), are pivotally mounted on rod 29 (Figs. 1 and 2) which is secured in the frame plates 301 and 302. The forward ends of the keys, bearing designating tips (Fig. 1), are adapted to be pressed down so as to cause the rear ends of the keys so pressed to rise, the axis of rod 29 (Fig. 2) acting as a center.

Key coupler

Figures 2, 3, 4, 5:
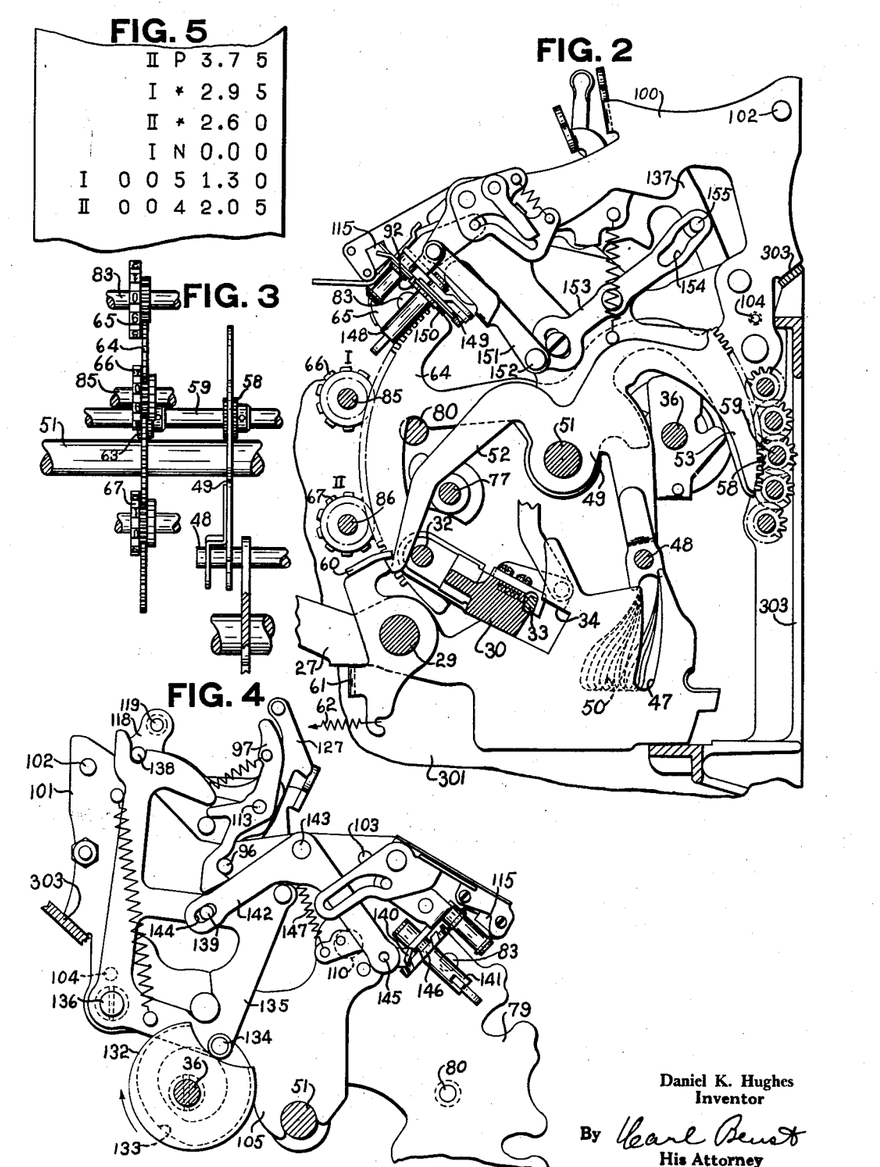
Fig. 2 is a vertical section through the machine, viewed from the right of the "ten cent" key bank looking to the left, with the cabinet removed and parts broken away, showing the differential means for setting the printing wheels.
Fig. 3 is a detail, showing the means for lateral transmission of the movement of the differential actuators for setting the "ten cent" printing wheels, as viewed from the front, to show the side spacing thereof.
Fig. 4 is a side elevation of the printing mechanism as viewed from the left.
Fig. 5 is a facsimile of a portion of a typical record strip produced by the machine, showing sample transactions.

A key coupler 30 (Figs. 1 and 2) loosely mounted on shaft 32, which is journaled in the frame plates 301 and 302, rests across all of the keys and by its weight normally retains the keys in the position shown in Fig. 2. The key coupler also functions in the usual manner to provide for the simultaneous operation of a plurality of keys, whereby a number of keys may be conditioned to operate by being hooked to said coupler and the machine finally operated by a complete operation of one of the hooked keys. In such an operation the key coupler is rocked, carrying with it, to complete their action, all the keys thereon hooked.

As key 27 (Fig. 2) is partially depressed at the forward end, a counter-clockwise movement is given it around the axis of rod 29 as a center, which movement rocks key coupler 30 in a like manner. The rod 29 and shaft 32 are so positioned that continued movement of the key causes the resilient edge 33 of the key coupler to engage beneath the shoulder 34 on the depressed key lever, and in front of the shoulders 34 of the undepressed keys. A full stroke mechanism, to be described, prevents the key coupler from returning to home position at this time. Keys subsequently partially depressed are hooked onto the raised key coupler, such being made possible by the resilient edge 33. By means well known in the art, described in the Shipley Patent 2,031,860, only one key in a given key bank may be depressed at one transaction. Therefore by providing individually mounted resilient edges 33 (Fig. 2), on the key coupler, for each bank of keys, the possibility of releasing a hooked key, by depressing another key in the same bank, is avoided. After all the keys pertinent to the data to be registered have been hooked on the key coupler, any one of such keys, except those having an undercut 54 (Fig. 17), may be used to force the key coupler to complete the first half of its oscillatory movement, after which the weight of the key coupler returns the keys to normal position completing the oscillatory movement of the key coupler, and completing the registering of the transaction. Keys having the undercut 54 may be provided if it is desired that they shall not be used to complete a machine operation, but shall be effective only to raise the key coupler a short distance so other keys may be hooked on. When such undercut key is operated, the rear edge of the key coupler jams against shoulder 55. When the key coupler is rocked the undercut key is carried with it having been hooked over the resilient edge before jamming.

Full stroke mechanism

Figure 6:
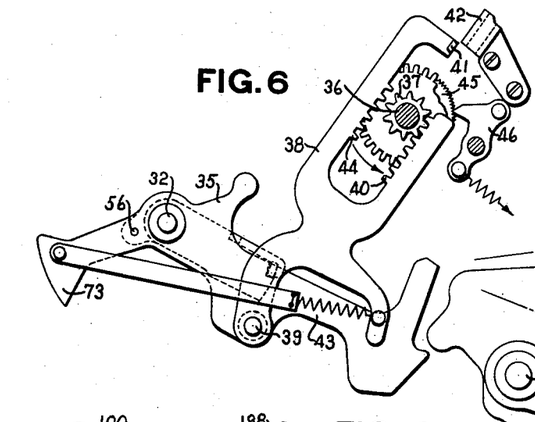
Fig. 6 is a detail, showing the full stroke mechanism and the drive shaft.

Loosely mounted on the right end of the key coupler shaft 32 is a lever 35 (Figs. 1 and 6) which, being fastened by pin 56 to the key coupler, is rocked first counter-clockwise as seen in Fig. 6, as a key is depressed, and then clockwise, as the key returns to home position. This rocking motion of lever 35, caused by the oscillation of the key coupler, is used to turn a drive shaft 36 (Figs. 2, 4, 6, 8, and 17) one complete rotation for every machine operation, through pinion 37 (Fig. 6) secured on shaft 36, and rack 38, pivotally mounted on the lever 35 by stud 39. On the counter-clockwise movement of lever 35, the rack 38 is forced upwardly and rearwardly with the teeth 40 of rack 38 held in contact with the pinion 37 by means of a nose 41 bearing on a guide 42 against which it rests until the completion of the counter-clockwise motion of lever 35. During the first part of the counter-clockwise motion of the lever 35, a spring 43 tends to turn the rack 38 counter-clockwise around the stud 39, but before the counter-clockwise motion of the lever 35 is finished the stud 39 passes the line of pull of spring 43 and the spring tries to turn rack 38 clockwise. As the nose 41 passes beyond the front slope of the guide 42 it will snap over the end thereof under the action of spring 43 just as the key coupler reaches the end of its counter-clockwise movement. Then, during the return movement of the rack 38, the nose 41 following the contour of guide 42 bears against its rear side and causes teeth 44 to engage pinion 37, as the lever 35 and the key coupler turn clockwise, causing the pinion 37 and shaft 36 to turn the remaining half of its complete rotation. A saw toothed ratchet wheel 45, secured to shaft 36, is engaged by a pawl 46 allowing the shaft 36 to turn in a counter-clockwise direction only, consequently requiring completion of every commenced operation of the machine.

Key release

Figure 15:
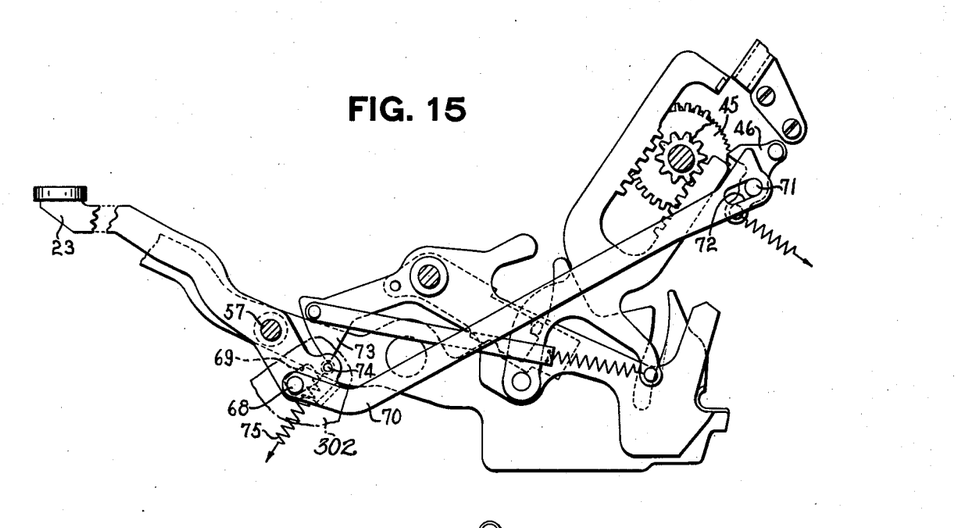
Fig. 15 is a detail, showing the release key mechanism.

Because the key coupler raised by a partial depression of a key is not allowed to return to home position by reason of the ratchet wheel 45 and pawl 46, it would be impossible, without a release mechanism, to correct a mistake caused by hooking the wrong keys onto the key coupler. To allow such corrections to be made, the release key 23 (Figs. 1 and 15) is provided to disengage pawl 46 (Figs. 6 and 15) from ratchet 45 at any time before the key coupler is raised sufficiently to operate the registering mechanism.

Key 23 (Fig. 15) is pivotally mounted on stud 57, supported by the right frame plate 302 (Fig. 1), and is held within defined limits of motion by pin 68 (Fig. 15), secured on the rear of key 23 and moving in a slot 69 in frame plate 302. Pivotally mounted on that portion of pin 68 projecting to the right of frame plate 302 is a link 70 connected at its rear end to the pawl 46 by a slot 72 engaging a pin 71 projecting from pawl 46 so that, by pressing down on the tip of key 23 the pawl 46 will be disengaged from ratchet 45. However, if the key coupler is raised sufficiently a fin 73 projecting therefrom engages a stud 74 on the release key lever, preventing the release key from being moved. A spring 75 keeps the release key in the raised or normal position when not in use.

*Differential mechanism*

The keys are divided, as described, into groups or banks, each bank of amount keys controlling a differentially settable member. The "dollar" keys control the dollar differentially settable member; the "ten cent" keys control the "tens of cents" differentially settable member; and the "cent" keys control the "unit of cents" differentially settable member. The "II" clerk's key and the "paid out" and "no sale" transaction keys each have a differentially settable member for operating the detail printing wheels which otherwise would be positioned to print a "cash" transaction by the "I" clerk.

Fig. 2, representing the "tens of cents" differential elements, will serve to illustrate the differential mechanism for all the key banks.

The key lever 27 has a cam slot 47, open at the top end, so located and shaped as to be adapted to engage a universal bar 48 mounted on the lower extending arm of the "ten of cents" differentially settable member 49. As the front end of the key lever 27 is depressed, causing a counter-clockwise motion of the key 27 around rod 29, the slot 47 moves the universal bar 48.

It is the purpose of the cam slot 47 to set the universal bar 48 and differentially settable member 49 associated with the "ten cent" key bank, according to the tens digit value of the key depressed. To accomplish this result the cam slots are graduated so that the key of a lower value rocks the universal bar 48 less than the key of a higher value. Thus the 10¢ key moves the bar 48 one step, the 20¢ key moves the bar 48 two steps, the 30¢ key moves the bar 48 three steps, etc. The graduations of a portion of the cam slots are illustrated diagrammatically by the dotted lines 50 in Fig. 2.

The differentially settable member 49 is pivoted on a cross member 51, and is provided with a forwardly extending arm 52 terminating in a toe, and a rearwardly extending arcuate arm 53 bearing teeth which mesh with a pinion 58 fastened on a transmission shaft 59 representing the "ten cent" bank of keys. Shaft 59 is journaled in forwardly extending flanges of the rear frame plate 303. The purpose of the member 49 is to differentially set the shaft 59 and through it set the "tens" printing detail wheel and the "tens" printing totalizer wheels as hereinafter described.

The other key banks are similar to the "ten cent" key bank except for the number of keys, each key bank controlling the movement of a transmission shaft. Each key bank controls the printing wheels representing it by means operated by its associated transmission shaft as will be described.

Still considering the "ten cent" key bank, shown in Fig. 2, as an example, the universal bar 48 and the differentially settable member 49 are moved, as a key is depressed, in a clockwise manner about the cross member 51. The amount of this angular movement is proportional to the tens digit value of the key depressed so that, upon completion of the first half of the operative cycle of the machine, the differentially settable member 49 is moved to a position in accordance with the tens digit value of the key depressed.

The toe of arm 52 is adapted to be engaged by a pawl 60, when no key of the bank has been depressed, so as to lock the differentially settable member 49 against chance movement. The pawl 60 is rockably mounted on rod 29 and has a bail 61 extending under all the keys of the key bank. By this arrangement, depression of any key in the bank will rock the pawl counter-clockwise unlatching the member 49. A spring 62 constantly tends to rock the pawl 60, clockwise to locking position, which event occurs as soon as all the keys in the key bank are in normal position. Each bank of differentially settable members is supplied with a similar latch.

Because the differentially settable member 49 and the differentially settable members representing the other key banks are not aligned with the printing wheels and printing totalizer wheels they differentially actuate, the lateral transmission shafts before mentioned are provided.

Still considering the "ten cent" key bank, the lateral transmission shaft 59 (Figs. 2 and 3) has secured upon it two pinions one of which, pinion 58 before mentioned, is driven by the differentially settable member 49 and the other of which, pinion 63, drives a toothed segment 64 (Figs. 1, 2, and 3) rotatably mounted on cross member 51. The segment 64 drives the "tens" printing detail wheel 65, the "tens" printing wheel 66 of the "I" totalizer printer, and the "tens" printing wheel 67 of the "II" totalizer printer. Each of the printing wheels 65, 66, and 67 has hubbed to it a pinion toothed to mesh with segment 64.

There is a lateral transmission means, such as has been described, between each key bank and the corresponding printing wheels, there being five transmission shafts similar to shaft 59 provided for this purpose, so that the differential setting for each key bank is individually transmitted to the printing wheel and printing totalizer wheels representing it.

All of the above described differential mechanism is old in the art, and is described herein to show one method by which the hereinafter described printing wheels and totalizer printing wheels can be differentially controlled.

*Frame for supporting detail printing wheels and printing totalizer wheels*

Figures 10, 11:
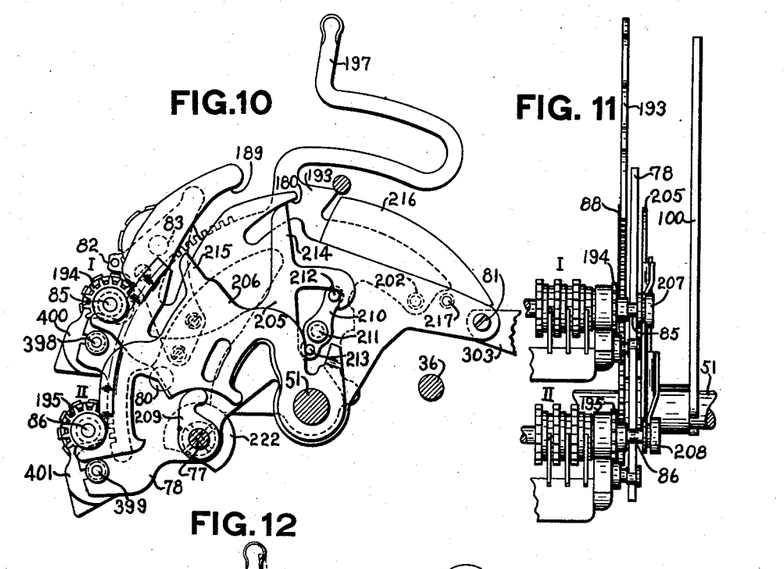
Fig. 10 is a side elevation of the totalizer resetting mechanism, as viewed from the right, showing the interlock mechanism for preventing more than one totalizer from being reset at one time.
Fig. 11 shows the mechanism of Fig. 10 as viewed from the front of the machine.

Mounted on cross member 51 and shaft 77 (Figs. 1 and 10) are a right printing wheel support frame plate 78 and a left printing wheel support frame plate 79 (Figs. 1, 4, 10, and 11) spaced by a supporting rod 80 (Figs. 4 and 10).

The plates 78 and 79 are secured to flanges projecting from the rear frame plate 303, the fastening 81 of the right frame plate being shown in Fig. 10.

Detail printing wheels

On the left side of right frame plate 78 is fastened an offset plate 82 (Fig. 10) which supports the right end of the detail printing wheel shaft 83. The plate 82 is offset from frame plate 78 to allow clearance for reset lever 193. The left end of the detail printing wheel shaft 83 is secured in the left frame plate 79 (Fig. 1). The printing wheels are rotatably mounted on the shaft in the order in which the key banks are arranged. The amount printing wheels representing amount banks are set so each normally presents the symbol "O" to the printing line. The transaction printing wheel normally presents a "*" to the printing line and the clerks printing wheel normally presents a "I" to the printing line. Each of the detail printing wheels is in constant mesh, by means of a hubbed pinion, with its actuating segment 64 and as a consequence the record strip printing is timed to take place at mid-cycle when the key coupler is at the top of its movement, as at that time the detail printing wheels present the data entered into the register. In the last half of the cycle of operation the printing wheels are returned to normal as the keys are returned by the key coupler.

Total printing wheels

For each clerk's key there is provided a set of amount printing totalizer wheels differentially settable by the same segments as the amount printing detail printing wheels. The segments are normally out of engagement with said totalizer wheels. During the first half of the cycle of operation the totalizer selected, by depressing a clerk's key, is engaged with the actuating segments and is disengaged therefrom during the last half of the cycle of operation as the segments are returned to home position. This results in the data entered into the totalizers being retained.

Tens carrying transfer mechanism is provided for in the totalizers similar to that shown in United States Patent No. 1,793,795, issued to Charles W. Green. As this forms no part of the invention, and as any transfer mechanism may be used in connection with said printing totalizers, no further disclosure is necessary.

Overflow wheels 84 (Fig. 1) on the printing totalizers are provided to accumulate and print amounts in excess of the amount that may be entered at one operation such as shown by the last two entries shown in Fig. 5.

The first four entries on the detail strip shown in Fig. 5, represent transactions printed by the detail printing wheels mounted on shaft 83 (Figs. 2 and 3). The "clerk's" symbol wheel is differentially set according to the key I or II depressed as also is the transaction symbol wheel in the same manner as the number wheels are set, except the actuating segments are shortened so as not to engage the overflow wheels of the totalizers with which they are alined. The last two of the sample entries are total printings from the "I" and "II" printing totalizers respectively. The symbols "I" and "II" (Fig. 1) are engraved on the frames of the respective printer totalizers as shown in Fig. 1, and are always printed with the printing of the total on the associated totalizer.

It is evident that an impression from the detail printing wheels requires the platen to carry the strip against five type wheels, whereas in taking an impression from either of the totalizers the platen must carry the strip against seven type wheels, thus decreasing the force with which each character is struck unless increased power is furnished the hammer on total printing operations. Provision has therefore been made for causing a harder blow to be struck by the hammer when a total printing operation occurs, insuring uniform printing. The mechanism for adjusting the printing hammer blows automatically will be discussed in detail hereinafter.

Totalizer engaging means

The totalizer shafts 85 and 86 (Figs. 10 and 19) are supported in frames 400 and 401 (Figs. 1 and 10) respectively, each of said frames being pivotally mounted between the printing wheel support plates 78 and 79 before mentioned. As viewed in Fig. 10, a clockwise rocking of the frames 400 and 401 around centers 398 and 399 will engage their respective totalizers with the differentially driven segments 64 (Fig. 1).

Totalizer engaging means has been provided to rock the frame 400 on each machine operation unless the "II" clerk's key is depressed in which event the "I" totalizer is held from engaging and the "II" totalizer is forced to engage. A special disabling mechanism has been provided for keeping both totalizers from engaging if either the "paid out" or "no sale" keys are depressed.

Figure 19:
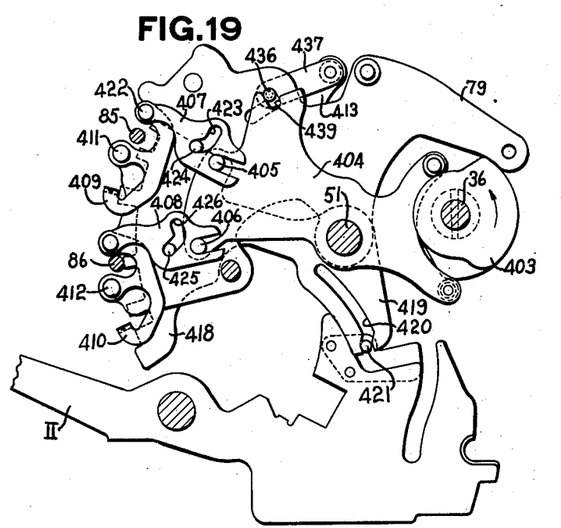
Figs. 19 and 20 are details, showing the totalizer engaging mechanism.

Referring to Fig. 19, the main drive shaft 36 has secured thereto a cam 403 which rotates once each machine operation and rocks a lever 404, pivotally mounted on cross member 51, first counter-clockwise then clockwise. Studs 405 and 406 carried by lever 404 engage bifurcations in levers 407 and 408 respectively. Levers 407 and 408 are pivotally mounted on pawls 409 and 410 which in turn are pivotally mounted on printing wheel support frame plate 79 by studs 411 and 412 respectively.

Figure 20:
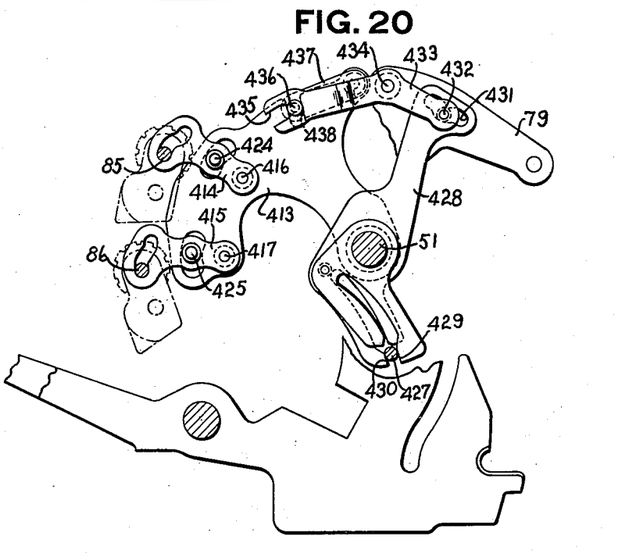

On a plate 413 (Fig. 20), which is pivotally mounted on cross member 51, are a cam lever 414 for engaging the "I" totalizer, and a similar cam lever 415 for engaging the "II" totalizer pivotally mounted on said plate by studs 416 and 417 respectively. A counter-clockwise movement of levers 414 or 415 around their respective pivots will engage the associated totalizer.

A selector plate 418 (Fig. 19) is rockably mounted on cross member 51 and has a downwardly extending arm 419 having a cam slot 420 engaging a stud 421 fastened to the "II" clerk's key. As the "II" clerk's key is depressed plate 418 is rocked clockwise. On the forward edge of plate 418 are a series of notches so arranged that in the normal position shown in Fig. 19 a high place is opposite totalizer shaft 86 and another high place is in front of the lower arm of pawl 409, thus preventing the engagement of the "II" totalizer and preventing the rocking of pawl 409 around pivot 411. With the selector plate 418 in the same position, pawl 410 is permitted to pivot around center 412, and shaft 86 is blocked by a high place on the notched edge. When the plate 418 is rocked clockwise due to depressing the "II" clerk's key shaft 85 is blocked by a high place, shaft 86 is unblocked, pawl 409 is permitted to pivot around center 411 and pawl 410 is prevented from pivoting around center 412.

Referring to the totalizer shaft 85, as shown in Fig. 19, when lever 404 is rocked by a machine operation stud 405 rocks lever 407 clockwise. Such movement of lever 407 will, because the lower arm of lever 409 is blocked from moving, be around stud 422 as a center, causing the shoulder in cam slot 423 to force stud 424 (Figs. 19 and 20) downwardly, rocking lever 414 counter-clockwise, which engages the "I" totalizer. At the same time stud 406 (Fig. 19) moves lever 408 clockwise, but because the lower arm of pawl 410 is free to move, pawl 410 moves counter-clockwise around pivot 412 and stud 425 rides freely in slot 426. When plate 418 is shifted, by depressing the "II" clerk's key, the opposite result occurs, totalizer "I" being held out of engagement and totalizer "II" being forced into engagement.

Means is provided to prevent either one of the totalizers from engaging during a "paid out" or "no sale" transaction. If either of these keys is depressed a stud 427 (Fig. 20) fastened thereto moves a lever 428. The "paid out" key moves lever 428 counter-clockwise and the "no sale" key moves lever 428 clockwise. This is accomplished by having two legs to lever 428 each leg associated with and having a cam slot cooperating with the stud of one of the two mentioned keys. By furnishing a shoulder 429 on the leg cooperating with the "no sale" key, and a shoulder 430 on the leg cooperating with the "paid out" key, the lever 428 is locked in the position shown in Fig. 20 when no key 25 is depressed, but when one or the other of the keys 25 is depressed the lever 428 is enabled to move in one direction or the other. Lever 428 has a cam slot 431 at its upper end which cooperates with a stud 432 secured to one end of a lever 433 pivoted on stud 434 projecting from the frame plate 79. Slot 431 is so shaped that movement in either direction from the center rocks lever 433 counter-clockwise. The forward end of lever 433 has a bifurcation 435 engaging a stud 436 carried by an arm 437 (Figs. 19 and 20) pivotally mounted on plate 413. Stud 436 engages a slot 438 (Fig. 20) at all times, and engages slot 439 (Fig. 19) when lever 433 is rocked by depressing the "paid out" or "no sale" key. When slots 438 and 439 are both engaged by the stud 436, plate 413 is made to move with lever 404 on each machine operation changing the position of pivot points 416 and 417 (Fig. 20) with reference to the action of levers 407 and 408 (Fig. 19) so that both totalizers are disabled, the motion of lever 404 being idle.

*Printer frame*

Rockably mounted on cross member 51 (Figs. 1, 2, 3 and 8) by claws 105 (Figs. 4 and 8) is the printer frame consisting of a right frame plate 100 (Figs. 2 and 8) and a left frame plate 101 (Figs. 1 and 4), spaced and secured by rods 102, 103, and 104 (Fig. 4) so as to form a supporting frame for the printing mechanism to be described.

In normal position the center of gravity of the printer frame and the mechanism it supports is to the rear of and above cross member 51, causing the frame to stay rocked rearwardly where it is supported on a portion of the rear frame plate 303 (Figs. 2, 4, and 8) positioned for that purpose.

In printing transaction data from the detail printing wheels onto the record strip the printer frame is not moved from its normal position as the platen is then directly over the printing line of said wheels.

In printing transactions from either the "I" or "II" totalizer printing wheels, the printer frame is rocked forward to either one of two positions, determined by stops, so as to position the platen 115 to take an impression from the "I" totalizer printer wheels or the "II" totalizer printer wheels, as selected by manipulative means to be hereinafter described.

*Record strip*

Figure 7:
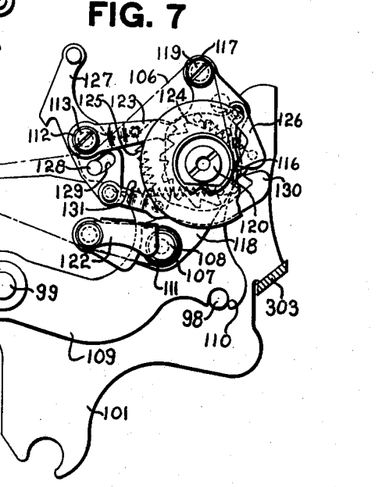
Fig. 7 is a side elevation of the record strip storage and feeding mechanism as viewed from the right.
Figure 8:
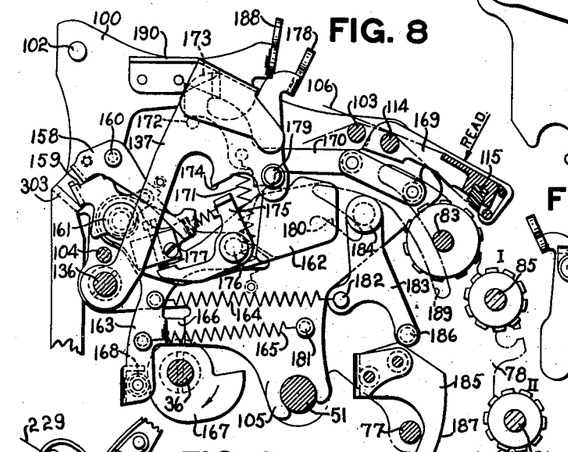
Fig. 8 is a vertical section from front to rear through the middle portion of the printing mechanism as viewed from the left.

Arm 109 (Fig. 7), pivotally supported on a stud 99 projecting from the left printer frame 101, is kept from movement by engagement of claw 110 with frame supported stud 98 and the engagement of spring held pawl 97 (Figs. 4 and 17) with stud 96. Pivotally mounted on arm 109 by means of stud 120 is a lever 118. Stud 120 also has mounted thereon a paper storage spool 116. Projecting from the lower arm of lever 118 is a stud 108 having rotatably mounted thereon a roller spindle 107 holding a supply roll of paper. The unused paper is transported from spindle 107 over rod 103 (Fig. 8) thence over rod 114, thence around the platen 115, over rods 114 and 103, thence under roller 112 (Fig. 7) mounted on a stud 113 on arm 109, thence over roller 117 mounted on stud 119 projecting from the upper arm of lever 118 to the storage spool 116. A spring tensioned bail 122 keeps the paper strip taut by pressing against the supply roll. It is evident that the rocking of arm 118 on stud 120, without allowing the paper supply roll 111 to rotate, will cause the paper strip to move back and forth a short distance over the platen. At rest, the lever 118 is positioned as shown in Fig. 7. During each printing operation, by means to be described, lever 118 is rocked first counter-clockwise bringing to printing position under the platen that portion of the record strip 106 which is normally on top of the platen in the "read" position as shown in Fig. 8. As the lever 118 (Fig. 7) rocks counter-clockwise, the spool 116 turns with it until a notch in ratchet wheel 124 hubbed to the spool encounters pawl 123 which stops the spool turning. At this point, the further counter-clockwise rocking of lever 118 by the machine causes the paper strip 106 to wind one step on the spool, which winding is complete at the end of the first half of the machine operation. On the return or clockwise rocking of lever 118, pawl 126 engages ratchet 124 and causes the spool 116 to rotate with the arm to rest position.

A lever 127 pivotally mounted on stud 113 extending from arm 109, whose angular movement is limited by a stud 128 extending into slot 129, has pivoted at its lower end a pawl 130 engaging ratchet wheel 124. Rearward movement of the upper end of lever 127 causes the pawl 130 to engage the ratchet 124 after a free movement equivalent to that allowed by pawl 123, before mentioned.

The record strip may thus be transported one step at a time by manipulation of the upper end of lever 127 which in no way involves movement of lever 118. Spring 125 holds pawls 123 and 130 in contact with the ratchet. Spring 131 returns lever 127 to home position after it has been pushed rearwardly.

As has been described, the drive shaft 36 (Fig. 4) makes one rotation in the direction of the arrow during each machine operation. Cam 132 secured to drive shaft 36 has a face groove 133 engaging a roller stud 134 extending from lever 135 which is pinned to a shaft 136 journaled in the right and left frame plates 100 and 101 of the printer (Figs. 4 and 8). Immediately to the left of the right frame plate 100 is a lever 137 (Fig. 8) also pinned to shaft 136. Lever 135 (Fig. 4) drives the record strip mechanism through stud 138 (Fig. 4) fastened on lever 118 and drives the left ribbon transporting mechanism through stud 139. On each machine operation cam 132 is rotated once, which rocks lever 135 clockwise as viewed in Fig. 4, on the first half of the cycle and counter-clockwise during the second half of the cycle. This rocking motion serves to advance the record strip by rocking lever 118 as has been described in addition to transporting the record strip from reading position to printing position and thence back to reading position.

On total printing operations, inasmuch as no operation of the keys is necessary, the shaft 36 will not be rotated. To rock lever 135 (Fig. 4) on total printing operations to cause the record strip to advance a step, the shaft 136 is rocked by lever 137 (Fig. 8) in a manner to be described in connection with total printing.

Ribbon mechanism

The printer is supplied with an inked ribbon 95 (Fig. 1) passing between the printing wheels and the record strip so that as the record strip is carried against the type by the platen, an inked impression will be made.

Each end of the inked ribbon is wound on a spool carried by a spindle, the left spindle 141 and spool 94 (Fig. 17) being constantly driven in one direction by pawl 140 (Figs. 4 and 17) turning ratchet wheel 146 one step each machine operation. Pawl 140, pivotally mounted on stud 145 carried by bell crank lever 142, is held in contact with ratchet wheel 146 by spring 147. Bell crank lever 142 pivotally mounted on stud 143, projecting from frame plate 101, is rocked counter-clockwise and then clockwise each printing operation by stud 139 and slot 144 connection with lever 135. The ratchet 146 is secured on spindle 141 and the spool 94 is frictionally carried on the said spindle so as to be normally turned therewith but subject to be turned contrary to the motion of spindle 141 by a force pulling the ribbon in the opposite direction.

The right spool 93 (Fig. 1) is loosely mounted on a spindle 148 (Figs. 1 and 2) which also has loosely mounted thereon a ratchet 150 (Fig. 2). The right spool is engaged with the ratchet 150 by a pin 92 so the two move together. The ratchet 150 is movable in either direction by a double acting pawl 149 actuated by link 151. The left spool tending to wind constantly in one direction takes up the ribbon if the right spool is unwinding but does not prevent the right spool from winding against the take up motion, as under such circumstance the frictional mounting of the left spool will allow slippage.

Ratchet 150 is driven by a pawl 149 actuated by link 151 which is oscillated first downwardly and then upwardly each machine operation through lever 153 pivotally mounted on frame plate 100 which lever is oscillated through stud 155 travelling in slot 154, said stud being mounted on the lever 137 before mentioned as moving forward and backward each printing operation.

Means for automatically determining in which direction the ribbon shall move is disclosed fully in the United States Patent No. 1,628,164, issued to W. E. Lippert to which reference is made.

Printing hammer and platen

On the left side of the right frame plate 100 of the printer (Fig. 8) is a stud 161 on which is pivotally mounted a printing hammer 162, having a normal position in which it rests on the upper edge of the horizontal arm of a bell crank lever 163 which is also pivotally mounted on stud 161. Bell crank lever 163 and the printing hammer not being in the same plane the forward or striking portion of the hammer has welded to it an extra width of metal to bring it into the plane of bell-crank 163 upon which it rests, said extra width of metal serving the additional purpose of weighting the hammer. Bell crank lever 163 is urged normally counter-clockwise by springs 164 and 165 against a portion of frame 100, an offset bearing edge 166 being provided on the downwardly extending arm of bell crank 163 for that purpose. Bell crank 163 thus may be turned clockwise only, against the force of springs 164 and 165. This movement of bell crank lever 163 occurs each machine operation through a cam 167 secured on drive shaft 36 which engages a roller stud 168 on the bell crank lever 163, forcing it clockwise. At approximately the middle of the operating cycle the cam 167 presents an abrupt break allowing the springs 164 and 165 to pull the bell crank lever 163 sharply counter-clockwise to its stopping point. Hammer 162 is likewise carried counter-clockwise but continues moving under its own momentum after bell crank lever 163 has been stopped.

Platen 115 (Fig. 8) is mounted in a frame 169 pivotally mounted on rod 114 journaled in the printer frames 100 and 101. Clutched by a tongue and groove connection to the frame 169 is a rearwardly extending arm 170 (Figs. 1 and 8) the under side of the rear end of which is adapted to be struck by the hammer 162 causing the platen to carry the record strip against the printing wheels. The forward end of arm 170 has a thumb piece by which the arm may be moved on rod 114 to the right, unclutching the frame 169. The thumb piece is normally held to the left in which position frame 169 and arm 170 move as a unit.

Attached on the inside of printer frame 100 is a shield 190 (Figs. 1 and 8) preventing the operator from holding the rear end of arm 170 so as to be unaffected by the hammer blow.

Spring 171 normally holds the platen slightly away from the printing wheels by holding the rear end of arm 170 against stud 172. A bent over portion 173 of lever 137 locks the platen against printing movement unless lever 137 has been rocked in a printing operation.

Total printing

As the cam 167 only rotates during a machine operation other means is provided for actuating the hammer in total printing operations which involve no rotation of shaft 36.

When lever 137 (Fig. 8) is manually rocked clockwise shoulder 174 engages pawl 175 pivotally mounted on hammer 162 by stud 176 and normally held clockwise by a spring against an adjustable screw stop 177 causing further clockwise rocking of lever 137 to rock hammer 162 clockwise against the action of springs 164 and 165. Due to the distance between centers 136 and 161, the shoulder 174 will eventually slide over pawl 175 allowing the springs 164 and 165 to cause the hammer to strike the platen a blow. On the return counter-clockwise rocking of lever 137 shoulder 174 by-passes pawl 175 by causing it to rock counter-clockwise.

As lever 137 is drawn forward by handle 178, a bracket 191 (Fig. 14) attached thereto is interposed between arm 170 and frame plate 100 (Fig. 1) preventing the shifting of arm 170 to the right to disable the platen.

The platen 115 (Fig. 8) is normally over the detail printer wheels on shaft 83 so as to be in proper position on each machine operation to print the transaction.

On total taking operations the platen and record material must be moved so as to be over the "I" or the "II" totalizer. This is accomplished by rocking the printer frame forward around cross-member 51 until the platen is over the selected totalizer.

If the operator wishes to print from the "I" totalizer, lever 137 is grasped by the handle 178 and drawn forward and downward which rocks the printer frame and associated parts around cross-member 51. Stud 179 extending from lever 137 enters cam slot 180 in the right printing wheel support plate 78 which is so shaped that lever 137 is rocked slightly clockwise with relation to the printer frame cocking the hammer, which is released as stud 179 reaches the bottom of the slot, which point also positions the printer frame so the platen will be over the "I" counter.

If the operator wishes to print from the "II" counter the printer frame is drawn forward by the handle 188 which causes stud 179 to enter cam slot 189 in the right printing wheel support plate 78, which allows the printer to rock forward until the platen is over the "II" counter. This cam slot is also formed so as to cock the hammer and release it as stud 179 reaches the bottom of the slot. In drawing the printer forward by handle 178, lever 137 moves slightly before the printer starts, thus causing stud 179 to enter slot 180 instead of slot 189 which it enters when handle 188 is used.

It is to be noted that the rim of cam 133 (Fig. 4) that is adjacent to stud 134 when the parts are at home position, is cut away to allow the printer to be rocked forward as would be otherwise impossible.

Device preventing incomplete total printing operation

One of the novel features of the invention is a device which prevents the printer frame from being returned to home position after being disturbed therefrom, unless a complete total taking operation is performed, causing an impression to be taken from the selected totalizer. This device prevents the operator from manipulating the printer in such a manner that a totalizer might be reset without an impression of the amount standing thereon being first taken.

Figure 14:
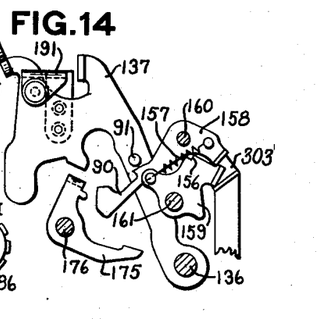
Fig. 14 is a detail, showing the mechanism for forcing a complete operation of the printer before it may be returned to home position.

Mounted on the left of printer frame 100 (Figs. 8 and 14) are two pawls 159 and 158 which are pivoted on studs 161 and 160. These pawls are normally in the position shown in Fig. 14 when the printer frame is in home position, pawl 159 resting against the rear frame plate 303. When the printer frame is rocked forward spring 157 (Fig. 14) tends to rotate the pawls 159 and 158 each clockwise as seen in Fig. 14 until the rear part of pawl 158 engages notch 156 in the periphery of pawl 159 which prevents the printer frame from being returned to home position, as the rear end of pawl 159 will then strike the rear frame plate 303 before that occurs. During the rocking of the printer frame forward the stud 179 (Fig. 8), as explained, will enter either cam slot 180 or 189 rocking lever 137 in relation to the printer frame. As such rocking occurs before pawls 158 and 159 are engaged at notch 156 the stud 91 will be out of the path of pawl 158 as it turns clockwise on stud 160, the notch 90 accommodating stud 91 during the remainder of the first half cycle. Pawls 158 and 159 remain engaged until the lever 137 has actuated the printing hammer and until the return movement of lever 137 which in by-passing bell crank lever 175, rocks the bell crank lever so that its upper extending arm strikes the forward extending part of pawl 158 and holds said pawl from engaging stud 91 as lever 137 moves home. At the same time lever 137 returns to home position, stud 91 holds pawl 158 disengaged from notch 156 and allows the printer frame to be returned to home position.

Automatic hammer adjustment

Due to the fact that printing from the detail printing wheels involves only five characters and printing from the printing wheels of either totalizer involves seven characters, provision has been made for causing the hammer to strike a more forceful blow when printing a total from the "I" or the "II" totalizer than it does when printing the transactions from the detail printing wheels on registering operations. This mechanism will now be described.

Springs 164 and 165 are attached at their rear ends to the bell crank lever 163. The front end of spring 165 is attached to sud 181 on the right printer frame 100. The front end of spring 164 is attached to stud 182 on a lever 183 pivoted on stud 184 extending from the right frame 100 of the printer. Secured to the right side of the right printing wheel support frame 78 is a cam 185 which guides a roller 186 mounted on a downwardly extending arm of lever 183. As the printer frame is rocked forward for total taking the roller 186 travels along cam 185 stretching spring 164. On total printing operations involving either the "I" or the "II" totalizer the roller reaches the surface 187 which is arcuate, having cross member 51 as a center, thus causing the hammer blows on the "I" and "II" totalizer printing wheels to be of the same force, which is greater than that exerted on the detail printing wheels due to the extra tension in spring 164.

Totalizer resetting mechanism

Figure 12:
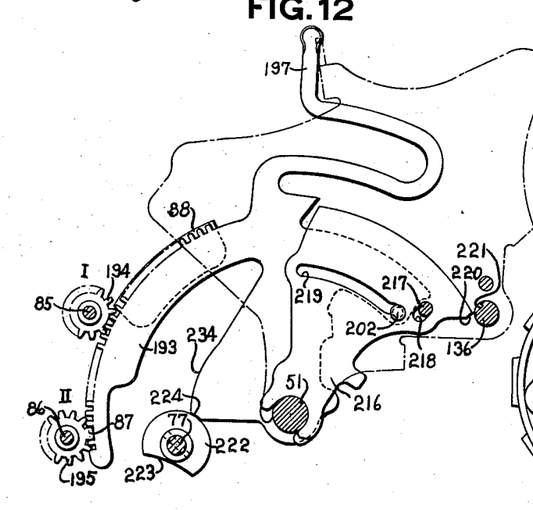
Fig. 12 is a side elevation, as viewed from the right, of the interlock preventing a total printing operation during a resetting operation and preventing a resetting operation during a total printing operation.

Pivotally mounted on cross-member 51 (Figs. 10, 11, and 12) is a segment shaped resetting lever 193 having a toothed arcuate edge for engaging pinions 194 and 195 (Figs. 10 and 11) secured on the right ends of totalizer shafts 85 and 86 respectively. Shafts 85 and 86 are shiftable laterally so as to allow pinions 194 and 195 to be engaged with and disengaged from the resetting lever.

Pinion 195 (Figs. 12) has a large tooth 87 which prevents its engagement with the resetting lever 193 unless the resetting lever is in home position, as in that position a tooth is broken out of the toothed arcuate edge to accommodate tooth 87. As the full stroke of resetting lever 193 turns shaft 86 but one rotation, the large tooth 87 does not interfere with the action of said lever.

Fastened to the left side of the reset lever, on that part of the arcuate edge engaging the pinion 194, is a plate 88 so positioned that the pinion 194 may engage the lever teeth if the lever is in home position but may not be engaged therewith or disengaged therefrom if the lever is out of home position.

Figure 13:
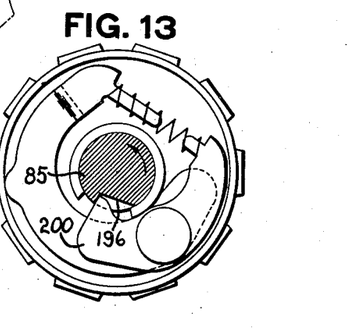
Fig. 13 shows a totalizer type wheel and its reset pawl in relation to the reset shaft.

Totalizer shaft 85 (Fig. 13) has a notch 196 associated with each wheel mounted thereon, each notch being adapted to be engaged by a pawl 200 carried by its associated wheel when the shaft is shifted to the right and the pinion 194 secured thereto is in engagement with the reset lever 193. As the reset lever is pulled down the shaft 85 is rotated and notches 196 cooperating with pawls 200 carry displaced wheels to zero position. As the shaft 85 is shifted to the left to disengage pinion 194 from the reset lever, the pawls 200 are disengaged from the notches and the totalizer wheels may be set by the differential without interference, as the pawls 200 ride the periphery of the shaft. The totalizer on shaft 86 (Fig. 12) is reset in the same manner. The totalizer resetting mechanism is old in the art and reference is made to United States Patent No. 1,874,277, issued to Fuller, if further description is desired.

The totalizers mounted on shafts 85 and 86 are reset by the same segment, but only one may be reset at a time, and before one may be reset an impression must be taken therefrom.

*Totalizer selection for resetting*

As before stated, as a total printing operation is performed the stud 179 (Fig. 8) enters either cam slot 180 or cam slot 189 depending on whether the printing is to be from the "I" totalizer, or the "II" totalizer.

Pivotally mounted on cross-member 51 (Figs. 10 and 11), between right printing wheel frame plate 78 (Fig. 11) and the right printer frame plate 100, is a cam plate 205 (Figs. 10 and 11) associated with the "I" totalizer shaft 85 and a cam plate 206 associated with the "II" printing totalizer shaft 86. On the right end of printer shafts 85 and 86 are secured collars 207 and 208 (Fig. 11) each having a peripheral groove to accommodate the forward end of its associated cam. As seen in Fig. 10 the pivotal movement of each of the plates 205 and 206 is limited, the upward movement of each plate being limited by a forward extending toe encountering the peripheral groove in its associated collar 205 and 206 and its downward movement being limited by the low portion of a locking cam 209 on shaft 77 before mentioned. If the high portion of cam 209 is positioned as shown in Fig. 10 each plate is held in the extreme upward position. If the high portion of the cam 209 is positioned elsewhere the cam plates may move downwardly until they strike the low part of cam 209. In their uppermost position cam plates 205 and 206 hold the shafts 85 and 86 to the extreme left as shown in Fig. 11 so that pinions 194 and 195 are not engaged with reset lever 193. This is the locked position during which neither printing totalizer may be reset. If either cam plate 205 or 206 is moved downwardly the associated shaft 85 or 86 would be shifted to the right and the printing totalizer shaft and pinion would be moved in position to be reset by moving lever handle 197 downwardly.

Means has been provided, if the high part of cam 209 is in ineffective position, to make certain that only one of cams 205 and 206 be in reset position at a given instant. This consists of a coupling lever 210 (Fig. 10) mounted pivotally on a stud 211 extending from the right printing wheel frame plate 78. Studs 212 and 213 projecting from either end of lever 210 engage hooked portions of cam plates 205 and 206 so that if cam plate 205 is rocked down, lever 210 is rocked counter-clockwise forcing stud 213 against cam plate 206 forcing it to its upper position. In this position of cams 205 and 206 actuation of resetting lever 193 will reset the "I" totalizer. Conversely, if cam plate 206 is rocked down, lever 210 is rocked clockwise forcing stud 212 against cam plate 205, forcing it to its upper position, whereupon actuation of resetting lever 193 will reset the "II" totalizer printer but not the "I" totalizer printer.

Figure 9:
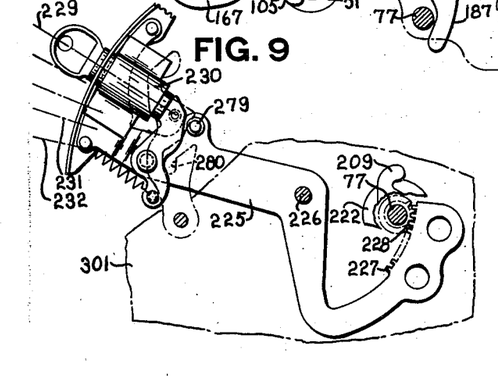
Fig. 9 shows the manual control lever for conditioning the machine for selected operations.

The aforementioned stud 179 (Fig. 8) enters slot 180 (Figs. 8 and 10) when an impression is taken from the "I" totalizer and at the same time strikes the upper extending arm 214 (Fig. 10) of cam plate 205 rocking plate 205 downwardly so that the "I" totalizer shaft is shifted so as to be reset, and the "II" totalizer shaft is held in position where it cannot be reset. The converse is true when an impression is taken from the "II" totalizer. Cam plate 206 will be rocked downwardly as stud 179 travelling in cam slot 189 encounters arm 215 forcing the "II" totalizer into engagement with the reset lever and forcing the "I" totalizer out of engagement therewith. Plates 205 and 206 are reset and locked in home position, shown in Fig. 10, by the high portion of cam 209 when shaft 77 is positioned so by control lever 225 (Fig. 9), as will be explained.

By this mechanism the operator of the machine is forced to take an impression from a totalizer before it can be positioned to be reset. This interlock is one of the novel features of applicant's invention. The mechanism, heretofore described, for forcing a full printing operation assures the full operation of cams 205 and 206.

*Lock preventing printing while resetting*

Resting by means of claws on cross-member 51 (Fig. 12) is a locking plate 216 supported and kept from angular movement around center 51 by a stud 217 (Figs. 10 and 12) extending from the right printing wheel frame plate 78 and engaging an elongated slot 218 in said plate 216. A slot 219 in plate 216 accommodates a stud 202 extending from resetting lever 193, said slot being shaped so that the slightest movement of reset lever 193 from normal position forces locking plate 216 radially outward from cross-member 51 as a center, causing shoulder 220 on plate 216 to be moved into notch 221 in shaft 136, thus preventing the printer frame from being rocked forward when the reset lever is out of home position.

Figure 16:
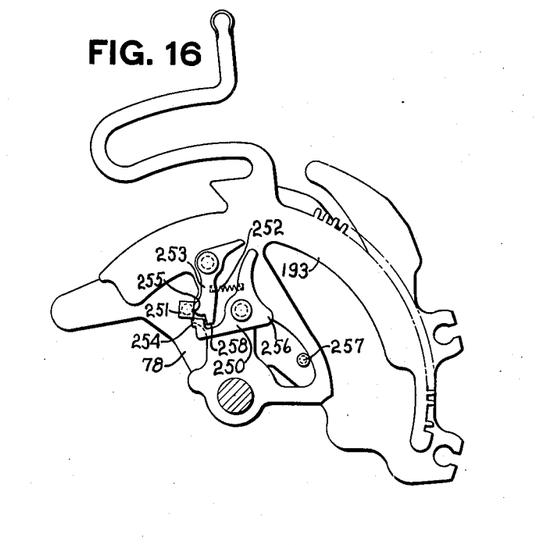
Fig. 16 is a detail, showing the full stroke mechanism for the reset lever.

A full stroke mechanism for the reset segment is shown in Fig. 16 which is like that described in United States Letters Patent No. 1,870,004, issued to Charles W. Green, to which patent reference has before been made. This full stroke mechanism is for the purpose of enforcing a completed operation of the reset plate and the consequent setting of the totalizer involved to zero.

Resetting lever 193 has pivoted thereto a locking pawl 250 (Fig. 16) normally bearing against the under side of a square stud 251 projecting from the right printing wheel frame plate 78. Spring 252 compressed between the upper extending arm of pawl 250 and the lower extending arm of a pawl 253, also pivoted on reset lever 193, will cause toe 254 to snap up against projection 255 on pawl 253, as reset lever 193 is pulled forward. Attempts to return segment plate 193 to home position fail as the tripped toe 254 hits the forward side of stud 251 unless the lever 193 is completely operated, under which circumstances the heel 256 strikes stud 257 and cocks the toe 254 under the end 258 so it may pass under stud 251 on the return of lever 193 to home position. As projection 255 hits stud 251 the parts assume their original position.

On shaft 77 (Fig. 12) is a locking cam 222 (Fig. 12) which prevents reset lever 193 from being moved unless the cut away edge 223 is positioned so as to pass the toe 224, which would otherwise hit the portion of the periphery of cam 222 that has not been cut away. The same cam 222 is prevented from turning and therefore the shaft 77 is locked against rotation, if reset lever 193 is displaced from home position as arcuate edge 234 engages the cutaway periphery 223.

Printer frame lock

To normally prevent the printer frame from being rocked to cause a total printing operation, a pawl 259 (Fig. 17) pivotally mounted on a stud 260 projecting inwardly from the left frame plate 301, is normally positioned to engage a square stud 261 on the left printer frame plate 101. Pawl 259 is positioned by a cam 262, secured on shaft 77, which cam has a slot 263 engaging a stud 264 projecting from pawl 259. Cam slot 263 is so formed that pawl 259 engages stud 261 except when the control lever, to be described, turns shaft 77 to position for resetting and total taking.

Control lever

Shaft 77 (Fig. 9), on which are mounted the cams 222, 209, and 262, is manually controlled by means of lever 225 pivotally mounted on stud 226 extending from the left frame plate 301. The rear end of lever 225 has an arcuate surface having teeth 227 which mesh with pinion 228 secured on shaft 77. Lever 225 may be moved by hand and locked in any of a plurality of positions, indicated by the lines radial to stud 226, allowing or preventing certain functions of the machine. The position of the lever in Fig. 9 indicated by radial line 229 through the center of a lock 230, shows the position in which it is impossible to print a total or reset a totalizer inasmuch as cams 209, 262, and 222 (Fig. 17) are in effective position to lock their respective parts as has been described.

By setting lever 225 (Fig. 9) to the position indicated by radial line 231, cams 209 and 262 are rendered ineffective to lock their associated mechanisms and a total may be printed. By setting lever 225 to the position indicated by radial line 232, locking cam 222 will be positioned so the reset lever 193 is free to be moved, enabling a total printing and resetting operation.

Cabinet

The machine is covered by a cabinet 265 (Figs. 17 and 18) preventing manipulation of the mechanism except through the keys and the control lever 225.

A lid 266 provided with a hinge 267 (Fig. 17) gives access to the printer under control of a lock 268 (Fig. 18) so that totals may be printed, totalizers reset, the ribbon changed, and the record strip removed and replaced by rocking the arm 109 (Fig. 7) forward by pawl 97 (Figs. 4 and 17) which unlatches the record strip storage unit from stud 96. The lid 266 also gives access to special counters 269 (Fig. 17) usually provided with this type of machine for registering the number of different classes of machine operations. The cabinet and printer are so fitted that with the cooperation of the interlocks heretofore described, the operator who has access to the printer through the lid 266 cannot manipulate the totalizers and printer so as to record a false total.

By locking the control lever so that a total printing or resetting is prevented the access to the printer through the lid will only permit the operator to change the record strip and ribbon.

As the manually operated record strip advancing lever 127 (Figs. 4 and 17) is inaccessible when the lid 266 is closed, means is provided whereby the operator may manipulate said lever from outside the cabinet. A link 270 (Fig. 17) slidably mounted between the underside of the lid and stud 271 mounted on a bracket secured to the lid, has a thumb piece 272 projecting through a slot 273 in said lid. Spring 274 keeps the link normally in the position shown in Fig. 17 so that a rearward movement given by the operator will rock lever 275, with which link 270 is pivotally connected, in a clockwise movement around stud 310 fastened to the cabinet. Lever 275 has a bent-over portion 276 adapted to move lever 127 to produce the desired movement of the record strip.

The lock 268 for lid 266 (Fig. 18) is designed so that to open the lid the bolt 277 is moved from beneath the double latches, the left latch 278 being illustrated.

Figures 17, 18:
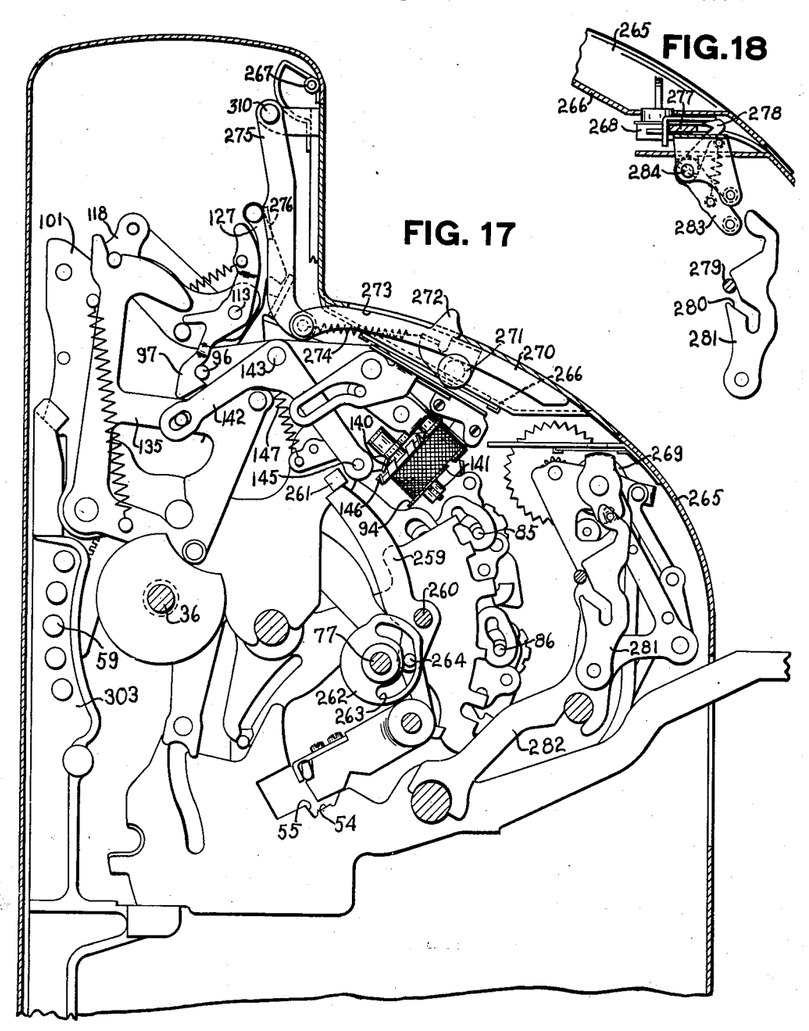
Fig. 17 is a section through the machine immediately to the right of the left frame plate with some of the parts broken away.
Fig. 18 is a detail, showing the lid lock and the dual control thereof.

Provision has been made for automatically unlatching the lid when the control lever 225 is moved to the position for total taking and resetting. Stud 279 on the lever 225 (Fig. 9) is adapted to engage a cam slot 280 (Figs. 9 and 18) on a lever 281 mounted pivotally on special counter support frame 282 (Fig. 17). Downward movement of stud 279, carried by the control lever in moving to total taking position, causes the lever 281 to be rocked counter-clockwise as viewed in Fig. 18 so that its upper end strikes lever 283 secured to shaft 284 on which the latches 278 are secured, rocking said latches away from the bolt and unlocking the lid.

The lid is supplied with viewing and writing apertures through which the last several transactions as recorded on the detail strip may be seen and opposite which notations may be made.

OPERATION

To register transactions on the machine it is necessary to have the control lever set for the operation desired, in which position it may be locked.

In the event it is desired to allow the clerk access to the record strip by supplying him with a key to the lid but denying him a key to the control lever, the record strip or ribbon may be removed or replaced but a total may not be recorded or a totalizer reset as such operations require manipulation of the control lever.

If the clerk is allowed to manipulate the control lever and to open the lid, a total may be taken from either totalizer, and the record strip removed and replaced. Due to the interlocks described, the impression means must be first operated before the totalizer in question can be reset.

In taking a total the operator chooses handle 178 or 188, depending on which totalizer is chosen for the operation, and by that handle rocks the printer forwardly and then back to home position.

A totalizer may not be reset unless an impression has been taken but it is not necessary to reset the totalizer after every total impression operation. No impression may be taken from a totalizer while a resetting is in progress.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, having a plurality of groups of printing wheels, the combination of impression means including a platen normally opposite a certain one of said groups of printing wheels but movable to a position opposite another one of said groups of printing wheels; a printing hammer for operating said platen; a spring normally operable to actuate said hammer to operate the platen with a predetermined force to take an impression from the wheels which may be opposite the platen; means for moving the platen opposite said other group of wheels; and means operated by said moving means to apply an additional tension to said spring to cause the platen to be actuated with greater force in its moved position than in its normal position.

2. In a machine of the class described, the combination of a plurality of groups of type wheels; a platen; a platen actuating means including a plurality of springs; a frame for holding record material and the platen normally opposite one group of type wheels but movable to place the platen and the record material selectively opposite other of the groups of type wheels so that an impression may be taken from any selected one of the groups of type wheels; a cam; and a cam follower carried by said frame and connected to one of said platen actuating springs, said cam follower being actuated by the cam when the frame is moved from normal position and operating to apply additional tension to said one platen operating spring, whereby said platen actuating means will actuate the platen with more force when the frame is in its moved position than when the frame is in its normal position.

3. In a printing mechanism for a cash register, the combination of impression means including a platen for carrying a record strip and a hammer for actuating the platen; a spring for actuating the hammer, which spring is tensioned by being stretched a predetermined distance after which the spring is released suddenly to actuate the hammer to effect a sharp blow on the platen; a first operating means for stretching the spring said predetermined distance and then releasing the spring; a second operating means for stretching the spring said predetermined distance and then releasing the spring; and means cooperating with said spring and operated by said second operating means to stretch the spring farther and apply additional tension to the spring when the second operating means is operating to stretch the spring said predetermined distance whereby the hammer and the platen actuated thereby will operate with a greater force when the second operating means is used than when the first operating means is used.

4. In a machine of the class described having a platen to take impressions from type wheels, and means for operating the platen to cause an impression to be made, the combination of a spring for actuating the operating means; a machine-operated means for applying a predetermined tension to the spring; manual means for applying said predetermined tension to the spring; and means actuated by the manual means to stretch the spring and apply additional tension to the spring whereby the spring is tensioned more by the manual means than by the machine-operated means.

5. In a machine of the class described having a plurality of groups of type wheels and one impression means movable to positions opposite the groups of type wheels to take impressions selectively from any group of the plurality of groups of type wheels, said impression means including a platen for carrying a record strip, and a hammer means for actuating the platen to take an impression by carrying such record strip against the selected group of type wheels, the combination of a spring for actuating the hammer means, which spring is tensioned by being stretched a predetermined distance after which the spring is released suddenly to actuate the hammer to effect a sharp blow on the platen and cause an impression to be made; machine-operated means for stretching said spring said predetermined distance to tension the spring to take an impression from a certain group of type wheels; manual means for moving the impression means selectively opposite other groups of type wheels and for stretching said spring said predetermined distance to tension the spring to take an impression from the selected group of type wheels; a cam; and a cam follower coupled to the spring and actuated by the manual means to cooperate with the cam and stretch the spring to apply additional tension to the spring to cause the platen to be operated with more force when taking an impression from other of said groups of type wheels than when taking an impression from said certain group of type wheels.

DANIEL K. HUGHES.